US008595362B2

(12) United States Patent  
Ford et al.

(10) Patent No.: US 8,595,362 B2
(45) Date of Patent: Nov. 26, 2013

(54) MANAGING HARDWARE RESOURCES FOR SOFT PARTITIONING

(75) Inventors: Thomas Ford, Prosper, TX (US); John A. Morrison, Fort Collins, CO (US); Michael S. Allison, Fort Collins, CO (US); Richard D. Powers, Highland Village, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 989 days.

(21) Appl. No.: 12/635,598

(22) Filed: Dec. 10, 2009

(65) Prior Publication Data

US 2011/0145412 A1 Jun. 16, 2011

(51) Int. Cl.
*G06F 15/173* (2006.01)
(52) U.S. Cl.
USPC .................... 709/226; 718/1; 718/104
(58) Field of Classification Search
USPC .......................................... 709/226
See application file for complete search history.

(56) References Cited

U.S. PATENT DOCUMENTS

| 2004/0215950 | A1* | 10/2004 | Lindeman ................. 713/1 |
| 2006/0020940 | A1* | 1/2006 | Culter ..................... 718/100 |
| 2009/0133028 | A1* | 5/2009 | Brown et al. .............. 718/104 |
| 2009/0216913 | A1* | 8/2009 | Moriki et al. .............. 710/4 |
| 2009/0276783 | A1* | 11/2009 | Johnson et al. ............ 718/104 |
| 2010/0250877 | A1* | 9/2010 | Gaither et al. ............ 711/162 |
| 2011/0035618 | A1* | 2/2011 | Jann et al. ............... 714/3 |
| 2011/0066840 | A1* | 3/2011 | Bandholz et al. .......... 713/100 |
| 2011/0093861 | A1* | 4/2011 | Flemming et al. .......... 718/104 |
| 2011/0107054 | A1* | 5/2011 | Hepkin et al. ............. 711/172 |
| 2011/0126194 | A1* | 5/2011 | Huynh et al. .............. 718/1 |

* cited by examiner

*Primary Examiner* — Hamza Algibhah
(74) *Attorney, Agent, or Firm* — Walt Karnstein

(57) ABSTRACT

Methods and apparatus for subdividing a hard partition of a computer server system into one or more soft partitions using partition management programming installed within firmware of the server system. The partition management firmware may be disposed at least partially on a central service processor and may be programmed to present generic interfaces, so that operating systems do not require modification to interface with the partition management programming.

20 Claims, 5 Drawing Sheets

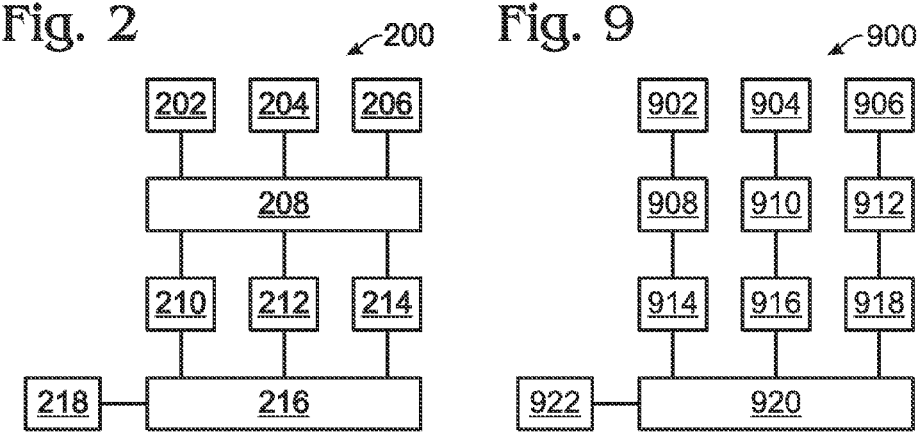
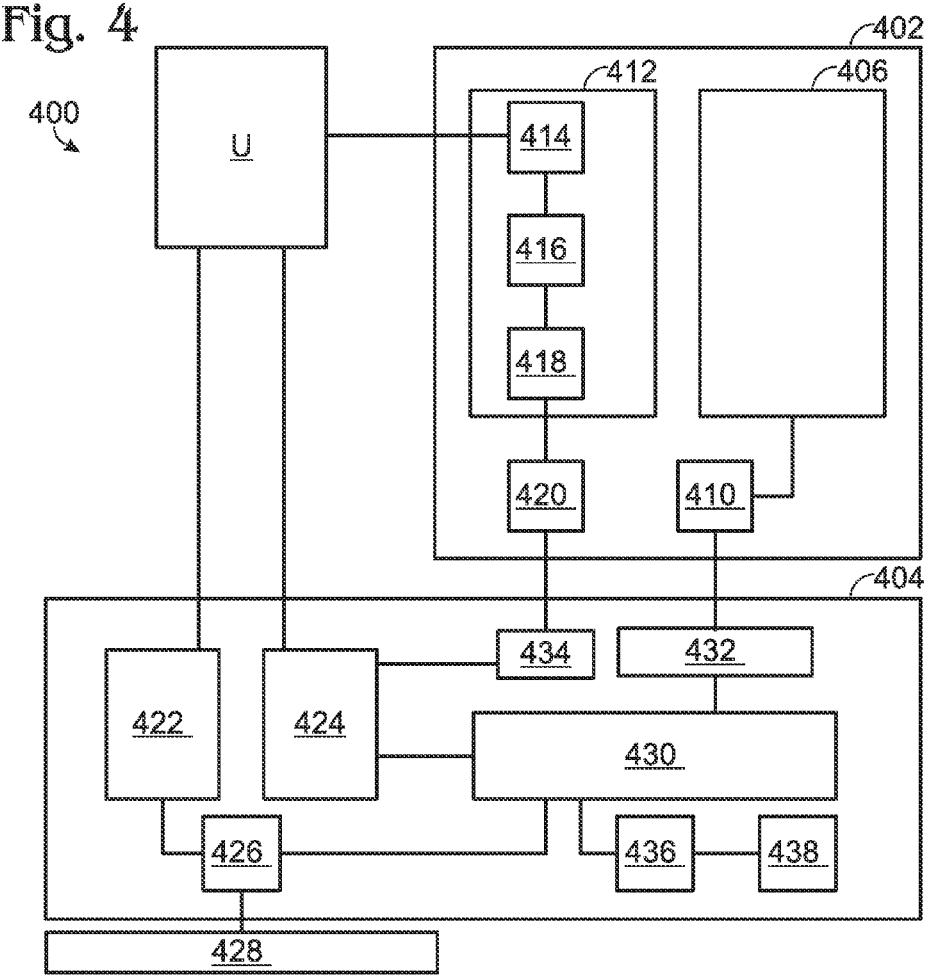

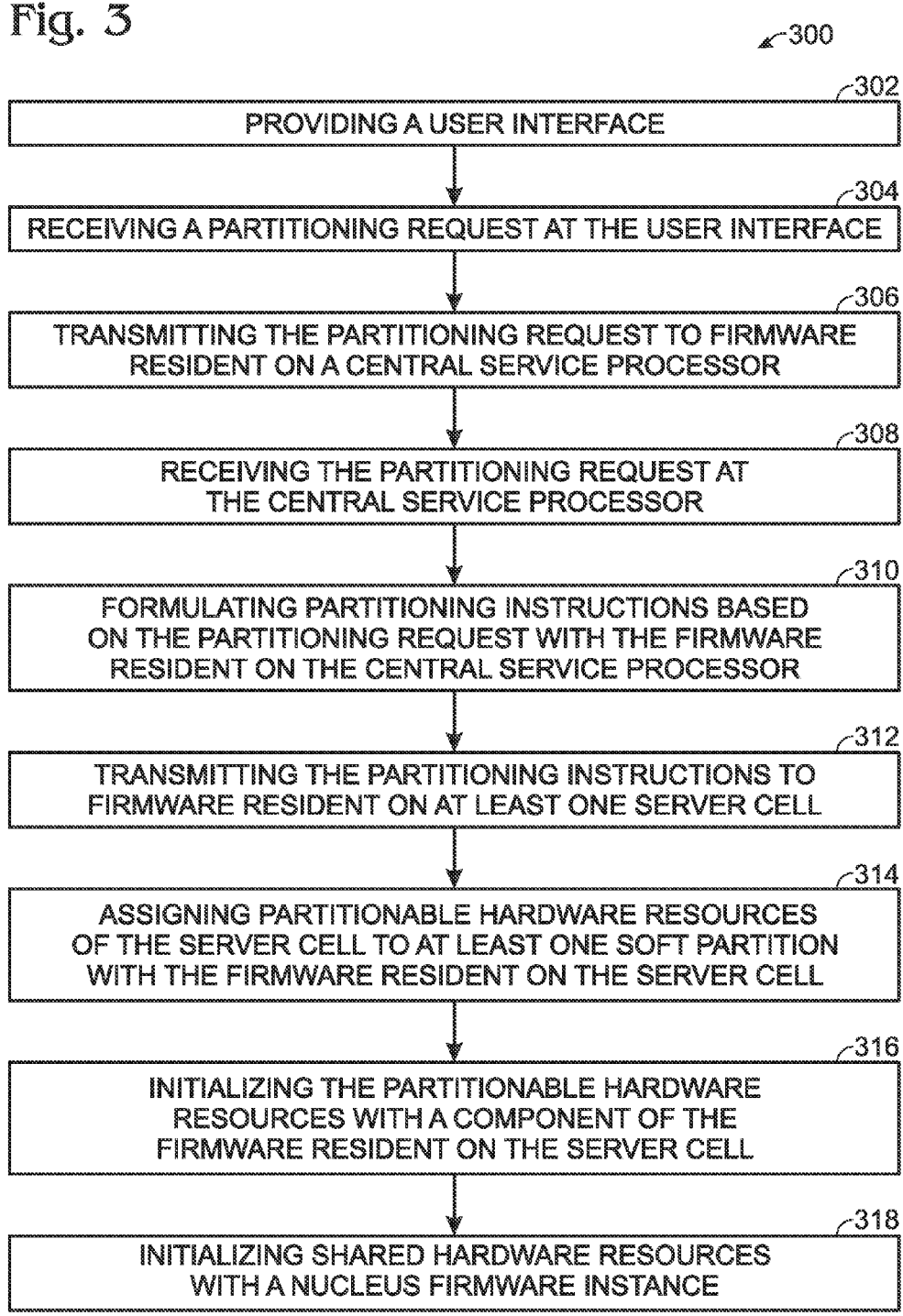

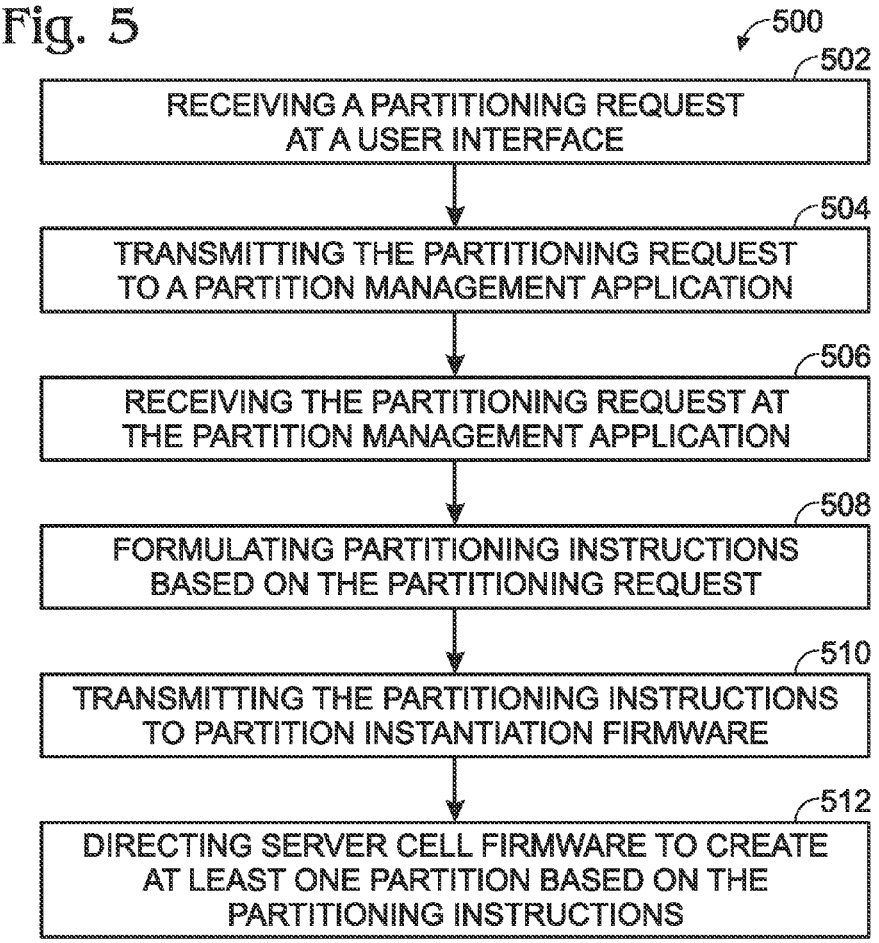
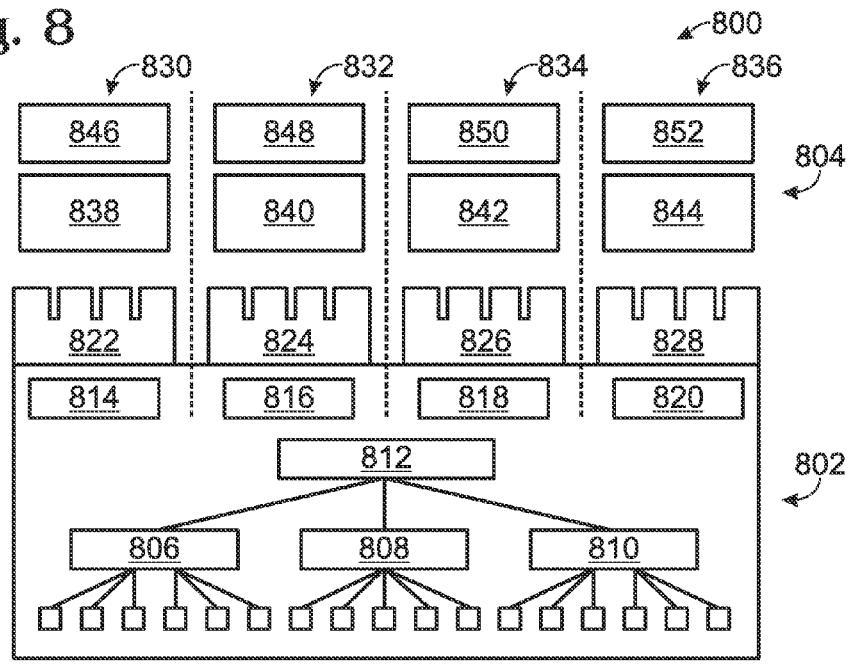

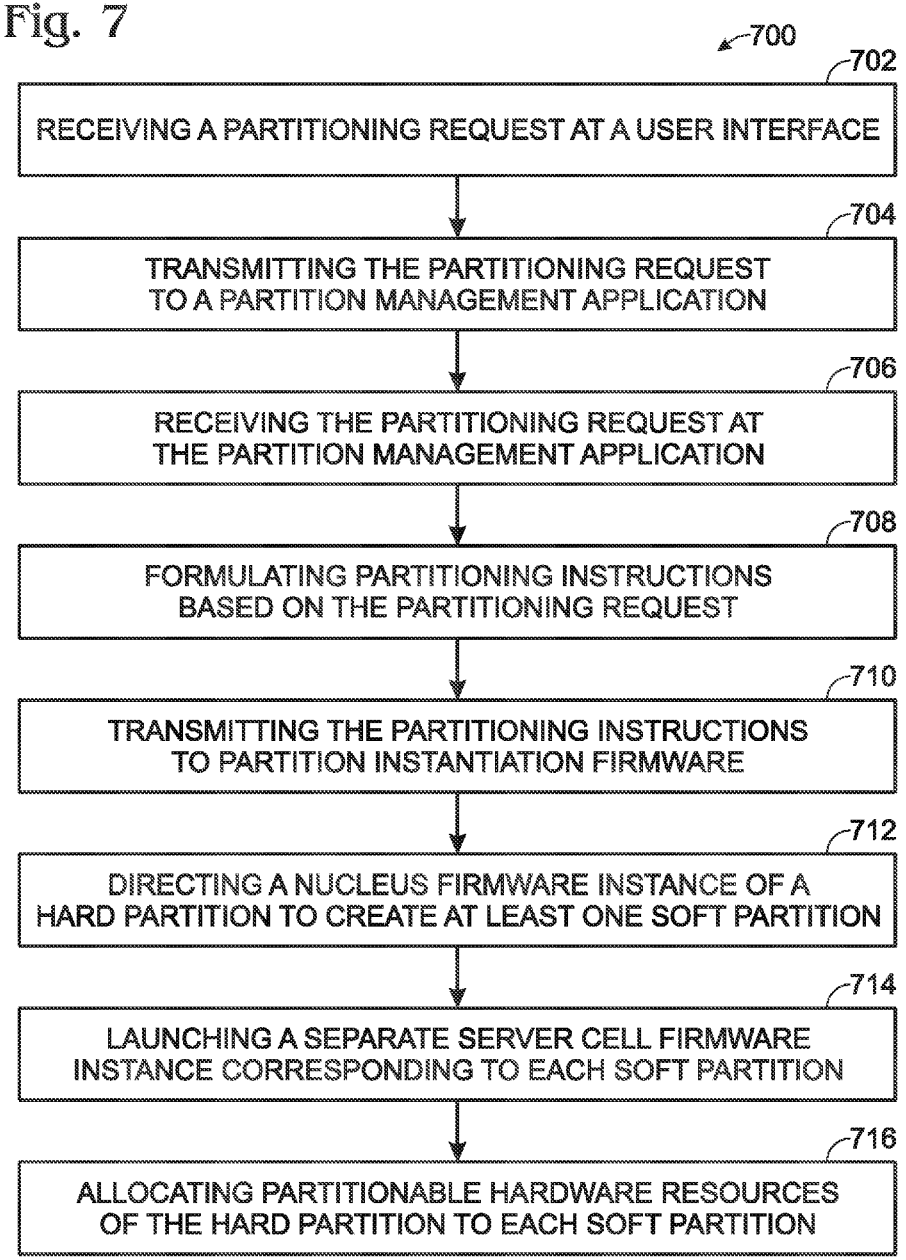

MANAGING HARDWARE RESOURCES FOR SOFT PARTITIONING

BACKGROUND

Computer systems, including both individual systems and server systems that may include the components of multiple individual systems, commonly may be separated into two or more discrete portions known as partitions. Each partition may, for example, be logically and/or physically separated from the other partitions, and each may allow a different operating system (or a different copy of the same operating system) to run on that particular partition. A partition may be a "soft partition," in which case it is typically only logically separated from the other partitions, or it may be a "hard partition," in which case it is typically also physically and/or electrically separated in some manner from the other partitions. Accordingly, creation of a soft partition generally does not involve physical changes to the structure of the system hardware, whereas creation of a hard partition may involve physical changes to the underlying hardware.

In server systems, a plurality of hardware resources, including multiple processors, memory devices, and input/output devices and connections, may be included in a single interconnected server complex. The hardware resources of a server system may be disposed on various physically separated server modules, which are sometimes referred to as server "cells" or "blades." In some cases, it may be desirable to divide such a server complex into multiple smaller systems by defining subsets of the server hardware resources to be used as independent system environments, in a form of hard partitioning. Furthermore, it may be desirable to divide each hard server partition into one or more soft partitions, each of which can support its own operating system without a further physical division of hardware resources.

When a hard partition is subdivided into soft partitions, some or all of the hardware resources of the hard partition generally are assigned to the various soft partitions. Software resident on the server system, which also may be referred to as firmware, may be used to inventory the hardware resources and to allocate them among the desired soft partitions. In existing systems, the operating system running on each soft partition typically must include a partition management program or some other modification configured to allow communication between the operating system and the firmware. This requires each operating system to be modified when installed on a soft partition, and also may slow system performance due to the possible allocation of the same hardware resources to more than one soft partition.

In light of the above, it would be advantageous to have partitioning systems and methods that can avoid the necessity of modifying each operating system to be used with a soft partition, and to overcome the performance issues often associated with allocating hardware resources to multiple soft partitions in existing systems. The present teachings solve these and other problems by providing systems and methods of subdividing a hard partition into one or more soft partitions using partition management programming installed entirely within firmware on a server system.

BRIEF DESCRIPTION OF THE DRAWINGS

FIG. 2 is a schematic diagram depicting how operating systems hosted by soft partitions access various computer hardware resources, according to an embodiment of the present invention.

FIG. 3 is a flowchart depicting a method of partitioning a computer server system, according to an embodiment of the present invention.

FIG. 4 is a schematic block diagram depicting a partitionable computer server system, according to an embodiment of the present invention.

FIG. 5 is a flow chart depicting a method of partitioning a partitionable computer server system, according to an embodiment of the present invention.

FIG. 7 is a flow chart depicting a method of allocating computer hardware resources of a hard partition to a soft partition, according to an embodiment of the present invention.

FIG. 8 is a schematic diagram depicting portions of a partitionable computer server system, according to an embodiment of the present invention.

FIG. 9 is a schematic diagram depicting how operating systems hosted by soft partitions access various computer hardware resources, according to an embodiment of the present invention.

DETAILED DESCRIPTION

A computer server system may be divided into various combinations of hard and/or soft partitions. A hard partition includes a set of dedicated hardware resources, such as processors (CPUs) and memory, which are physically separated and electrically isolated from other hardware resources of the server system. For example, the resources of a particular hard partition may be disposed on one or more modular server cells or blades, while additional server modules contain the resources of other hard partitions. The present teachings relate to methods and apparatus for subdividing a hard partition into one or more soft partitions using partition management programming installed within firmware of the server system.

I. Allocation of Hardware Resources

According to the present teachings, firmware residing on a server system stores the configuration of the hardware resources of a hard partition, initializes (i.e., activates and prepares for use) the hardware resources, and allocates the hardware resources to one or more soft partitions. The hardware resources are typically allocated to the soft partitions in such a way that the resources are not shared among the soft partitions. In other words, each hardware resource is assigned to at most one soft partition at a time, to avoid conflicts between the soft partitions and any possible resulting performance compromises.

Also according to the present teachings, the firmware of the server system presents generic interfaces to each operating system running on a soft partition, so that there is no need for an intermediate software layer (such as a virtualization monitor layer) between the operating system and the firmware. For this reason, operating systems do not require modification to interface with the system firmware. Instead, each operating system interacts directly with the hardware resources allocated by the firmware to the corresponding soft partition, without modification due to the fact that the underlying soft partition is a subdivided hard partition.

Figure 1:
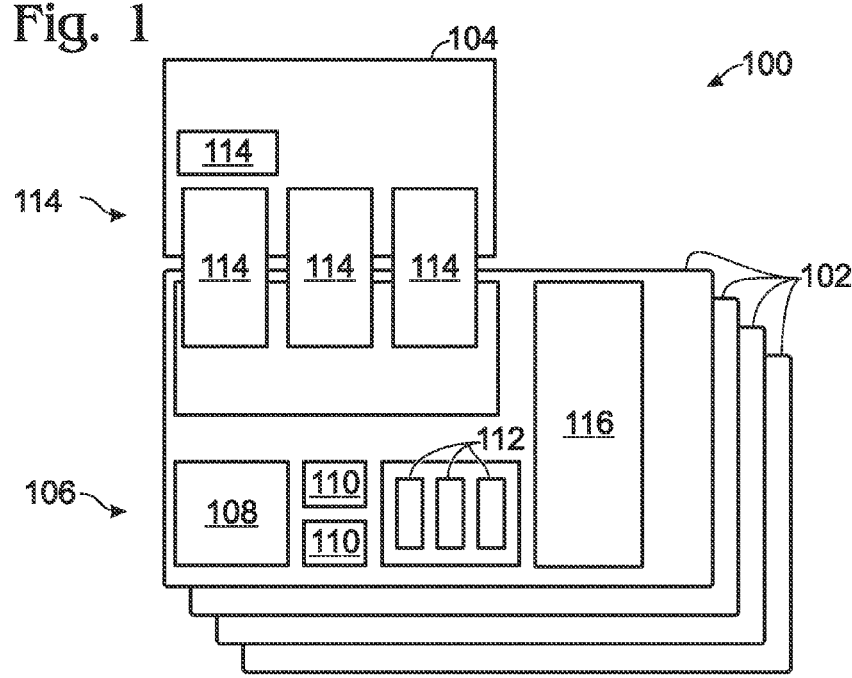
FIG. 1 is a schematic block diagram depicting portions of an exemplary computer server system, according to an embodiment of the present invention.

FIG. 1 schematically depicts portions of an exemplary computer server system 100, according to an embodiment of the present invention. System 100 includes a plurality of modular server cells 102, which also may be referred to as server blades. Although FIG. 1 depicts four server cells, in general any desired number of one or more cells may be included in system 100. System 100 also includes a central service processor 104, which is networked to cells 102. Server cells 102 and central service processor 104 operate together to allocate the partitionable hardware resources of system 100 to a desired number of soft partitions, each of which can host a separate operating system.

Each server cell 102 includes a variety of partitionable hardware resources, generally indicated at 106. The partitionable hardware resources of each server cell may include, for example, a central processing unit (CPU) 108, memory 110, and/or input/output (IO) slots 112. In some cases, each server cell may include more than one processor, such as a main server CPU and a management processor that enables various partition startup and shutdown functions even when the main server CPU is not active.

Partitionable hardware resources 106 may be divided into one or more hard partitions, each of which includes a physically separated and electrically isolated portion of resources 106, such as the partitionable hardware resources residing on an integer number of server cells 102. For simplicity, this description assumes that the hardware resources of cells 102 represent just one hard partition, but the present teachings also may be applied when the resources of a server system are divided into a plurality of hard partitions.

Central service processor 104 is configured to provide a partitioning user interface and to receive partitioning requests at the user interface. These requests may include requests for both hard partitions and soft partitions, although the remainder of this description will focus primarily on the creation and management of soft partitions. Central service processor 104 includes firmware resident on the central service processor, indicated at 114, one or more components of which may be configured to provide the partitioning user interface, to receive partitioning requests, to formulate partitioning instructions based on the partitioning requests, and to transmit the partitioning instructions to server cells 102. As FIG. 1 depicts, various portions of firmware 114 may span both the central service processor and one or more of server cells 102, and may run partially on the central service processor and partially on a management processor of the server cell(s).

Firmware 114 resident on the central service processor also may be configured to perform various other functions in addition to those related to partitioning. For example, another component of the firmware resident on the central service processor may be configured to monitor the health of various portions of the server system and/or to correct errors, and yet another component of the firmware resident on the central service processor may be configured to manage and/or control the various other firmware components resident on the central service processor, such as the health monitor firmware, the partition interface firmware, and the partition creation firmware.

Server cells 102 include server cell firmware 116 configured to receive partitioning instructions from the central service processor, to create one or more soft partitions based on the partitioning instructions, and to assign partitionable hardware resources to the soft partitions. A soft partition may encompass the total set of partitionable hardware resources of a hard partition, in which case just one soft partition typically will be created, or a subset of those resources, in which case more than one soft partition typically will be created.

When multiple soft partitions are created, the server cell firmware may be configured to assign each partitionable hardware resource to only one soft partition at a time, to avoid conflicts that could otherwise result if multiple operating systems requested the same resources at the same time. Furthermore, creation of the soft partitions may be performed so that each soft partition is configured to host an associated operating system without modification of the operating system. In other words, each soft partition may present generic interfaces to an operating system so that the soft partition is able to host unmodified or "shrink wrapped" operating systems that are unaware they are running in a soft partitioned environment.

Containing the partitioning solution within firmware resident on the server system in the manner described above, and thereby avoiding the requirement of operating system modifications, provides more efficient partitioning and also results in improved performance relative to systems where the soft partitions are coupled together through an intermediate agent residing between the firmware and each operating system. Furthermore, a self-contained partitioning solution is more economical, because it does not require simultaneous modifications of firmware and operating systems, and can present users with a unified interface for the creation of both hard and soft partitions.

FIG. 2 is a schematic diagram depicting how operating systems hosted by soft partitions access various hardware resources according to an embodiment of the present invention. Specifically, FIG. 2 depicts a server system, generally indicated at 200, in which a hard partition has been divided into three soft partitions, each of which hosts an associated operating system 202, 204, 206. As described previously, a first portion 208 of the firmware resident on the hard partition is configured to activate and control partitionable hardware resources of the system, and this portion of the server cell firmware thus assigns partitionable hardware resources 210, 212, 214 to the operating systems. As FIG. 2 indicates, partitionable hardware resources 210, 212, 214 may be assigned to each operating system in a nonoverlapping manner, to avoid conflicts.

Also as depicted in FIG. 2, server system 200 includes shared hardware resources 216 that will generally be used by more than one soft partition. These shared hardware resources may include, for example, memory controllers, IO controllers, and/or server cell controllers, among others. Rather than being activated and controlled by first portion 208 of the firmware resident on the hard partition, shared hardware resources 216 are activated and controlled only by a second portion of the server cell firmware 218 that runs independently of the soft partition operating systems. For reasons described in more detail below, this second portion of the firmware resident on the hard partition may be termed a "nucleus" firmware instance. Controlling shared hardware resources 216 with nucleus firmware instance 218 avoids conflicting operating system accesses of the shared hardware resources by the operating systems of the soft partitions.

FIG. 3 is a flowchart depicting a method, generally indicated at 300, of partitioning a computer server system according to an embodiment of the present invention. At step 302, a user interface, such as a graphical user interface (GUI) or a command line interface (CLI) is provided to allow a user to enter partitioning requests. Typically, the user interface will be provided by a partition configuration application residing in firmware of a central service processor. Alternatively or in addition, a user interface may be provided by one or more operating systems residing on preexisting hard partitions of the server system, or by an external partition management application configured to manage multiple hard partitions at once. At step 304, a partitioning request is received at the user interface. Partitioning requests generally received at step 304 may include requests for the creation of at least one hard and/or soft partition, although the remainder of FIG. 3 relates primarily to the creation of one or more soft partitions. At step 306, the partitioning request is transmitted from the user interface to a firmware component resident on the central service processor, and at step 308, the partitioning request is received at the central service processor.

At step 310, the central service processor firmware formulates partitioning instructions based on the partitioning request received at the user interface, and at step 312, the partitioning instructions are transmitted to one or more server cells of the server system. These will generally be modular components, such as server blades, each including partitionable hardware resources such as CPUs, memory, and IO slots. The partitioning instructions will be transmitted to server cell firmware resident on the server cells, which is configured to activate and control the partitionable hardware resources of each cell.

At step 314, the server cell firmware creates at least one soft partition based on the partitioning instructions received from the central service processor. Each soft partition will generally be configured to host an associated operating system without modification of the operating system, i.e., without requiring installation of a partition monitor layer. As part of step 314, the server cell firmware assigns the partitionable hardware resources to the soft partition(s) based on the partitioning instructions. If only one soft partition has been requested, the server cell firmware may assign all of the available partitionable hardware resources to the soft partition. If more than one soft partition has been requested, the server cell firmware will typically be configured to assign each partitionable hardware resource only to one soft partition at a time, to avoid potential conflicts.

As noted previously, a computer server system according to the present teachings may include both partitionable hardware resources such as CPUs, memory and IO slots, and shared hardware resources such as cell controllers, memory controllers and IO controllers that are typically not associated with a particular soft partition. In this case, one portion of the server cell firmware may be configured to control the partitionable hardware resources and another portion of the server cell firmware may be configured to control the shared hardware resources.

Accordingly, method 300 may include at step 316 initializing the partitionable hardware resources with a portion of the server cell firmware that assigns the partitionable resources to the associated operating systems. In addition, method 300 may include at step 318 initializing the shared hardware resources with another portion of the server cell firmware, which may be termed nucleus firmware, which operates independently of the associated operating systems. The steps of initializing both the partitionable hardware resources and the shared hardware resources may be performed either before or after the partitionable hardware resources are assigned to one or more soft partitions.

II. Central Service Processor Partition Management

As generally described above, according to the present teachings an administrator processor, which also may be referred to as a central service processor, is configured to provide a partitioning user interface and to receive partitioning requests at the user interface. This section describes additional details of how management of both hard partitions and soft partitions may be combined into a central partition management application embedded on the central service processor of a partitionable system.

More specifically, according to an embodiment of the present invention, a communication channel may be provided between operating systems running in partitions and the central service processor so that partition management tools hosted by the operating systems can communicate with the partition management application on the central service processor, and thus continue to function as they have on previous partitionable systems. In addition, the partitionable system's internal communication paths may be used to allow partition management tools hosted by the operating systems to communicate with the partitionable server's firmware to implement the specified partitions.

FIG. 4 is a schematic block diagram depicting a partitionable computer server system, generally indicated at 400, according to an embodiment of the present invention. Server system 400 includes a modular server cell 402 and a central service processor 404. Although only one modular server cell 402 is depicted in FIG. 4, server systems according to the present teachings generally may include a plurality of modular server cells, which also may be referred to as server blades. These cells may be divided into one or more electrically isolated hard partitions, as described above. However, for simplicity, FIG. 4 depicts just a single hard partition consisting of a single server cell 402. A user, indicated by the symbol U, may provide input to the server cell and/or the central service processor as described in more detail below.

Server cell 402 includes partitionable hardware resources, generally indicated at 406. These resources can include, for example, CPUs, memory, and/or IO slots, among others. Server cell 402 also includes server cell firmware 410 configured to control the partitionable hardware resources. This can include, for example, initializing the hardware resources and assigning them to one or more soft partitions, which may be created by the server cell firmware. Server cell 402 is configured to host an operating system, which is generally indicated at 412. More generally, operating system 412 may be hosted by a hard partition that includes server cell 402.

In some cases, one processor of the server cell may be configured to run a first portion of firmware 410, and another processor of the server cell may be configured to run a second portion of firmware 412. More specifically, a management processor of the server cell may be configured to run firmware that performs various partition startup and shutdown functions that may occur at times when the main processor of the server cell is inactive. This firmware also may be hosted in part by central service processor 404, and thus may span the central service processor and the server cell.

Operating system 412 is configured to provide a partitioning user interface 414, an intelligent platform management interface (IPMI) message service 416, and an IPMI driver 418. User interface 414, which may include a command line interface and/or a graphical user interface, is configured to receive partitioning requests from a user, as will be described in more detail below. IPMI message service 416 is configured to convert the partitioning requests into IPMI packets, and also to convert IPMI response packets into results that are viewable by a user in user interface 414. IPMI driver 418 is configured to transmit IPMI packets out of operating system 412, and to receive IPMI response packets into operating system 412.

Server cell 402 also includes IPMI hardware 420, which also may be referred to as block transfer interface hardware, and which is configured to receive IPMI packets from operating system 412 and to transmit the IPMI packets to central service processor 404. Similarly, IPMI hardware 420 is configured to receive IPMI response packets from central service processor 404, and to transfer the response packets to operating system 412. Typically, IPMI packets are transferred between IPMI hardware 420 and a command reflector resident on the central service processor, as will be described in more detail below.

Central service processor 404 is networked to server cell 402 and will generally also be networked to any other modular server cells of the server system, when more than one server cell is present. The central service processor includes various components relating to partitioning the hardware resources of server cell 402. Typically, these components will be in the form of firmware configured to provide one or more particular functions, although in some cases a component may be provided as a non-programmable hardware component. This description will focus on the purpose and effect of the various components of the central service processor.

In the embodiment of FIG. 4, the central service processor is configured to provide both a graphical user interface (GUI) 422 and a command line user interface (CLI) 424. Each of these interfaces is configured to receive partitioning requests from user U and to relay back to the user the results of those requests. Each interface also may be configured to receive other user input and to provide other output to a user. For example, GUI 422 and CLI 424 may be configured to provide health status information relating to various hardware components of system 400, including hardware components of server cell 402 and/or hardware components of the central service processor itself.

Central service processor 404 also includes a GUI translator 426, which is configured to translate commands received from a GUI into a command string. Translator 426 may be configured to receive and translate partitioning commands from GUI 422, and also from an external partition management application 428, which may in some cases be used to partition multiple server systems at once, while allowing a user to interact only with a single application. In this case, commands from the external management application may be translated into an appropriately formed command string by translator 426.

Partition management firmware 430 resides on central service processor 404, and is configured to receive partitioning requests and to translate the partitioning requests into partitioning instructions. Typically, the partition management firmware will receive partitioning requests either from CLI 424 or from translator 426, which translates requests made either through GUI 422 or through external partition management application 428. Based on the partitioning requests it receives, partition management firmware 430 formulates partitioning instructions and transmits those instructions to partition instantiation firmware 432.

Partition instantiation firmware 432, which also resides on central service processor 404, is configured to receive partitioning instructions from partition management firmware 430 and to transmit partitioning commands to server cell firmware 410 based on the partitioning instructions. The commands transmitted by partition instantiation firmware 432 are relatively low-level commands that can be understood by the system firmware residing on server cell 402. As described previously, the server cell firmware can then assign the partitionable resources of server cell 402 to one or more soft partitions, based on the partitioning commands it receives from partition instantiation firmware 432.

Because the partition instantiation firmware resides on central service processor 404, it is generally configured to remain active even if one (or all) of the system partitions are shut down, or if no partitions yet exist. Alternatively, the partition instantiation firmware may reside partially or entirely on one or more of the server processors, in which case the server processor(s) may be configured to run in a special "platform management mode" when the associated partitions are shut down, to allow creation and activation of partitions. A management processor may be provided on each server cell to host (or partially host) the partition instantiation firmware so that various partition startup and shutdown functions can be performed even if the main processor(s) of each server cell are shut down.

Central service processor 404 also includes a command reflector 434. Command reflector 434 is configured to receive partitioning requests from IPMI hardware 420 and to check the validity of the partitioning requests. The command reflector reflects invalid requests back to IPMI hardware 420 (typically with an accompanying error indication), and transmits valid partitioning requests to partition management firmware 430 by translating the corresponding IPMI packets into a command string and sending the command string to CLI 424. In this manner, partition management firmware 430 is configured to receive partitioning requests either directly from a user (through GUI 422 or CLI 424), or from operating system 412 residing on server cell 402.

As FIG. 4 depicts, when a partitioning request is received from operating system 412, the request is converted into IPMI packets by IPMI message service 416, transmitted out of operating system 412 by IPMI driver 418, transmitted to the central service processor by IPMI hardware 420, filtered through command reflector 434 (which may reflect any request found to be invalid), and then transmitted to CLI 424 just as if it were received as a command string directly from the user. CLI 424 then transmits the partitioning request to the partition management firmware without distinguishing whether it was received through operating system 412 or from a user logged into the CLI.

Command reflector 434 also may be configured to gather output information that results from a command string transmitted to the partition management firmware, to package that output information into IPMI response packets, and to transmit the IPMI response packets back to server cell 402 (or more generally, back to the initiating hard partition). IPMI response packets received at server cell 402 then pass successively through IPMI hardware 420, IPMI driver 418, and IPMI message service 416, before being displayed to a user as output at user interface 414.

Central service processor 404 also may include a hardware manager 436 and a health repository 438. Health repository 438 will typically be configured to receive and store information regarding the health of various hardware components of system 400, including partitionable hardware components 406 of server cell 402 and any other partitionable hardware components of the system. Health repository 438 communicates this health information to hardware manager 436, which may be configured to maintain to deactivate or otherwise change the status of sufficiently unhealthy hardware components. Accordingly, when partition management firmware 430 receives partitioning requests, it may communicate with hardware manager 436 in order to formulate partitioning instructions that accurately reflect the availability of healthy hardware components in the system.

Aside from requests to create partitions from scratch, various other types of partitioning requests may be received by partition management firmware 430 and transmitted in an appropriate form to server cell 402. For example, the present teachings permit a user to start and stop partitions, change the configuration of partitions including removing partitions, save partition configuration information for future use, recall previously defined partition configuration information later (e.g., after a power cycle of the system), activate some or all of the partitions described in saved partition configuration information, and boot an operating system in each activated partition.

More specifically, partitioning requests may include, among others, requests to (1) start a partition and get it to run a replicated firmware instance so that the replicated firmware can launch an operating system; (2) force the shutdown of a partition by forcing the hardware to quiesce; (3) request the graceful shutdown of a partition; (4) report the current status of a partition (e.g., shut down, active, shutting down); (5) save the partition configuration without actually creating and starting the partition; and (6) recall a saved partition configuration, assign hardware resources, create the partition, start the replicated firmware, and launch an operating system in the partition. Any of these partitioning actions, and not merely the creation of a partition, may be performed based on an appropriate partitioning request.

FIG. 5 is a flow chart depicting a method, generally indicated at 500, of partitioning a partitionable computer server system according to an embodiment of the present invention. Method 500 may, for example, be performed with system 400 described above and depicted in FIG. 4. At 502, method 500 includes receiving a partitioning request at a user interface. The user interface may be provided by a central service processor or by an operating system hosted by a preexisting partition (typically a hard partition), and may be a command line interface or a graphical user interface. Furthermore, partitioning requests may be received at an external management application without passing through a user interface provided either by a central service processor or by an operating system.

At step 504, partitioning requests are transmitted to a partition management application residing within firmware on the central service processor. As noted above, this can occur in various ways. For example, if a partitioning request is received at a user interface provided by the central service processor, the request may be transmitted either directly to the partition management application (if it was received at a CLI) or through a GUI translator and then to the partition management application. If a partitioning request was received at an external partition management application, the request again may be transmitted through a translator and then to the partition management application.

If a partitioning request is received at a user interface provided by an operating system hosted by a preexisting partition, the request may be passed through an IPMI message service of the operating system configured to convert the partitioning request into IPMI packets, and then through an IPMI driver, IPMI hardware, and to a command reflector disposed on the central service processor and configured to check the validity of the partitioning request. If the request is valid, it may be converted from IPMI packets to a command string and transmitted to the central service processor via a CLI, just as if the request was received directly at the CLI.

At step 506, the partitioning request is received at the partition management application. At step 508, the partition management application formulates partitioning instructions based on the partitioning request. This step may involve communicating with a hardware manager and/or a health repository, as described previously. At step 510, the partitioning instructions are transmitted to partition instantiation firmware residing on the central service processor, where they are translated into lower-level commands that can be understood by system firmware residing on server cells of the system. At step 512, the partition instantiation firmware directs the server cell firmware to create at least one partition based on the partitioning instructions. For example, the partition instantiation firmware may direct the server cell firmware to allocate partitionable hardware resources of a preexisting hard partition to various soft partitions, based on a user's original partitioning request.

III. Firmware Replication

As described previously, the present teachings generally relate to methods and apparatus for subdividing a computer server system into one or more hard and/or soft partitions using partition management programming installed entirely within firmware on a server system. Each hard partition includes a set of partitionable hardware resources such as, for example, processors (CPUs), memory, and IO resources, which may subsequently be allocated to a desired number of soft partitions. This section describes additional details of how soft partitions may be created and managed by one or more replicated copies of the system firmware.

More specifically, according to an embodiment of the present invention, the configuration of partitionable hardware resources within a hard partition is stored within a "nucleus" firmware instance residing within the hard partition. This nucleus firmware instance also may be configured to initialize (prepare for use) the partitionable hardware resources. When a soft partition is requested, the nucleus firmware instance launches a separate instance of itself for the soft partition, and allocates a portion of the partitionable hardware resources to the soft partition by assigning the resources to the separate firmware instance. Each soft partition created in this manner presents itself to an operating system as through it were a complete computer system with its own CPU, memory, and IO resources. The resulting soft partition operating system interfaces are thus indistinguishable from the operating system interfaces presented by a hard partition.

Figure 6:
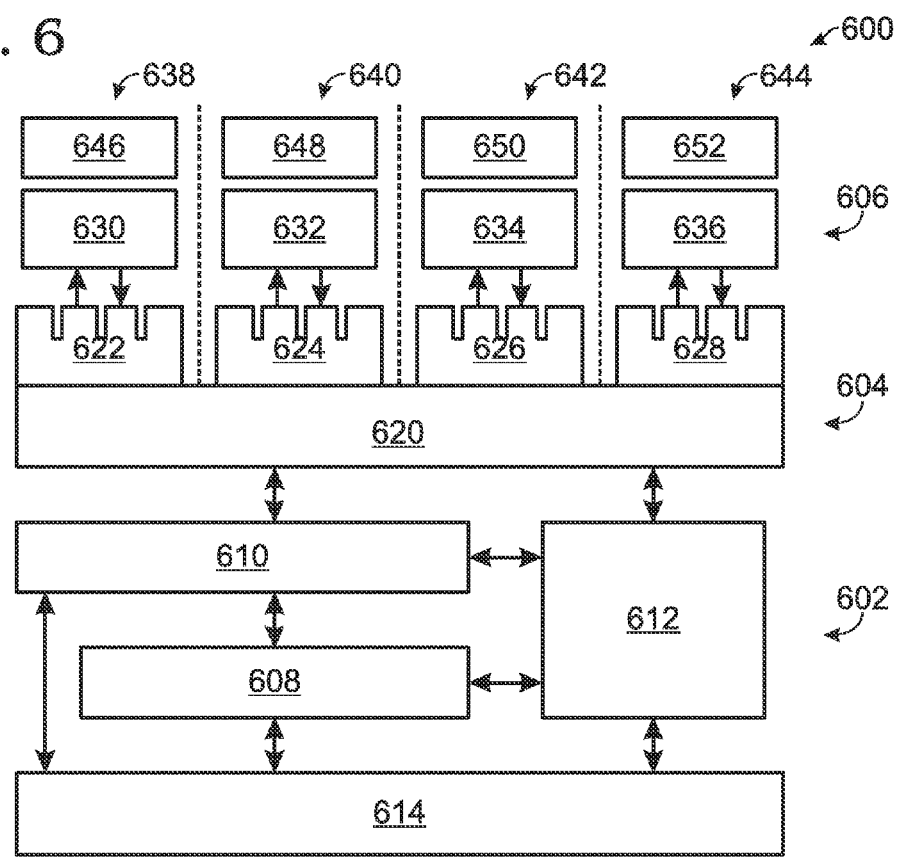
FIG. 6 is a block diagram schematically depicting portions of a partitionable computer server system, according to an embodiment of the present invention.

FIG. 6 is a schematic diagram depicting portions of a partitionable computer server system, generally indicated at 600, according to an embodiment of the present invention. System 600 includes a central service processor, generally indicated at 602, a hard partition or server cell region, generally indicated at 604, and a hosted operating system region, generally indicated at 606. Only a single hard partition 604, including one or more modular server cells or blades, is depicted in the embodiment of FIG. 6. In general, however, server systems according to the present teachings may include multiple hard partitions, each of which includes one or more modular server cells, and each of which may be split into a desired number of soft partitions as described in more detail below.

Central service processor 602 includes several firmware components configured to perform various functions. A partition configuration firmware component 608 is configured to provide a user interface to receive partitioning requests from a user, and to transmit those requests to other firmware components. A partition instantiation firmware component 610 is configured to initialize hardware components of the server cells to create hard partitions from the server cells, and also to transmit instructions to create soft partitions, based on the received partitioning requests, through a shared memory interface to firmware disposed on existing hard partitions such as hard partition 604. In some cases, the partition instantiation firmware component may be hosted partially by the central service processor, and partially on the hard partition by a management processor configured to remain active even if the main server processor(s) of the hard partition are shut down.

A health monitor firmware component 612 of central service processor 602 is configured to monitor performance of other firmware components of the system, and also may be configured, for example, to transmit an error message or a status alert to a user if it detects subnormal performance of a monitored component. A management firmware component 614 of the central service processor is connected to each of the other firmware components of the central service processor, and is configured to activate and control these other firmware components.

Hard partition 604 includes one or more modular server cells, each of which has its own processor(s), memory, and IO resources. Each server cell also includes its own copy of server cell firmware, which also may be referred to as system firmware. When a hard partition is created from one or more server cells, the system firmware copies of each server cell of the hard partition are merged into a single firmware component that may be referred to as a nucleus firmware instance. The nucleus firmware instance thus resides on the hard partition and spans all of the server cells of the partition. Because system 600 is depicted as including only a single hard partition 604, system 600 also includes a single nucleus firmware instance 620 associated with the hard partition.

As noted above, firmware disposed on central service processor 602 is configured to transmit partitioning instructions to firmware disposed on hard partition 604. More specifically, when one or more soft partitions are requested by a user, partition instantiation firmware component 610 of the central service processor transmits instructions to create the soft partitions to nucleus firmware instance 620 of the hard partition. The nucleus firmware instance is configured to launch a separate firmware instance 622, 624, 626, 628 corresponding to each soft partition, and to allocate partitionable hardware resources of the hard partition to each soft partition by allocating the hardware resources to each corresponding firmware instance. Preparation of partitionable hardware resources for use by an operating system then may be performed by any suitable combination of nucleus firmware instance 620 and replicated firmware instances 622, 624, 626, 628.

Each separate firmware instance 622, 624, 626, 628 is configured both to launch and to host a distinct operating system 630, 632, 634, 636, forming four distinct soft partitions generally indicated at 638, 640, 642, 644. Furthermore, each replicated firmware instances is configured to give control of the corresponding hardware resources to its hosted operating system when the operating system is launched, and to regain control of those hardware resources when the operating system shuts down, in the manner of a BIOS.

The operating systems running on the soft partitions may include multiple copies of a single type of operating system, or entirely different types of operating systems. Each operating system can host its own program applications, as indicated at 646, 648, 650, and 652. Although FIG. 6 depicts four separate firmware instances 622, 624, 626, 628 corresponding to four soft partitions, in general any desired number of soft partitions may be created, provided that sufficient partitionable hardware resources are present in the hard partition.

Nucleus firmware instance 620 will typically be configured to allocate the partitionable hardware resources of hard partition 604 to soft partitions 638, 640, 642, 644 in such a way that the partitionable hardware resources are not shared among the soft partitions, but rather are divided into distinct portions. In other words, each partitionable hardware resource will typically be assigned to at most one soft partition at a time, to avoid performance compromises that might result from conflicts between soft partitions seeking to utilize the same hardware resources at the same time.

Furthermore, firmware instances 622, 624, 626, 628 will typically be configured to present generic interfaces to each operating system running on a soft partition, so that there is no need for an intermediate software layer (such as a virtualization monitor layer) between the operating system and the firmware. Accordingly, operating systems will typically not require modification to operate correctly within a soft partition of system 600. Instead, each operating system will generally be able to interact with the hardware resources allocated by the nucleus firmware to the corresponding soft partition, without modification due to the fact that the underlying soft partition is a subdivided hard partition.

FIG. 7 is a flow chart depicting a method, generally indicated at 700, of allocating computer hardware resources of a hard partition to a soft partition, according to an embodiment of the present invention. Method 700 may be performed, for example, using any of the computer server systems described above, such as server system 600. At 702, method 700 includes the step of receiving a partitioning request at a user interface. The user interface may be provided by a central service processor of a computer server system, by an operating system hosted by a preexisting partition, or by an external management application, and may be provided in any suitable form, such as a graphical user interface or a command line interface.

At 704, method 700 includes the step of transmitting the partitioning request to a partition management application. As in the previously described exemplary methods, this can occur in several different ways. If the partitioning request is received at a user interface provided by the central service processor, then the request may be transmitted directly to the partition management application, possibly through a GUI translator if it was received at a GUI. If the partitioning request was received at an external partition management application, it similarly may be transmitted through a translator and then to the partition management application.

When a partitioning request is received at a user interface provided by a preexisting operating system, the request may be passed through an IPMI message service configured to convert the partitioning request into IPMI packets, and then through an IPMI driver, IPMI hardware, and to a command reflector disposed on the central service processor and configured to check the validity of the partitioning request. If the request is valid, it may be converted from IPMI packets to a command string and transmitted to the central service processor via a CLI, just as if the request was received directly at the CLI.

At step 706, method 700 includes receiving the partitioning request at the partition management application. At step 708, the partition management application formulates partitioning instructions based on the partitioning request. This step may involve communicating with a hardware manager and/or a health repository, as described previously. At step 710, the partitioning instructions are transmitted to partition instantiation firmware residing on the central service processor, where they are translated into commands that can be received and acted upon by a nucleus system firmware instance spanning the server cells of the system.

Method 700 also includes at 712 the step of directing a nucleus firmware instance of a hard partition to create at least one soft partition. This step will generally be performed in response to the partitioning request received in step 702. Thus, for example, if a user requests various soft partitions having particular characteristics at step 702, step 712 may include transmitting commands to create the desired number of soft partitions with the requested characteristics. The nucleus firmware instance, which spans all of the modular server blades of the hard partition, receives the transmitted partitioning commands from the partition instantiation firmware.

At 714, method 700 includes the step of launching a separate server cell firmware instance corresponding to each requested soft partition. These separate system firmware instances will typically be launched by the nucleus firmware instance, in response to the partitioning commands received from the central service processor, and each separate firmware instance will be configured to host a distinct operating system and thus to form a soft partition.

At 716, method 700 includes the step of allocating partitionable hardware resources of the hard partition to each soft partition, by allocating hardware resources to each separate system firmware instance. The hardware resources may be allocated in a nonoverlapping manner, so that each resource is allocated only to one soft partition at a time. In addition, the separate firmware instances may present generic operating system interfaces, so that "shrink wrapped" operating systems can run without modification on soft partitions created according to method 700.

FIG. 8 is a schematic diagram depicting portions of a partitionable computer server system, generally indicated at 800, according to an embodiment of the present invention. System 800 is similar to system 600 of FIG. 6, except that FIG. 8 shows additional details of the partitionable hardware resources of a hard partition, generally indicated at 802, divided into a plurality of soft partitions. FIG. 8 also shows an operating system region 804. FIG. 8 does not depict a central service processor from which hard partition 802 receives partitioning commands, although a central service processor will generally be included in system 800.

Hard partition 802 includes a plurality of processors (CPUs) 806, a plurality of memory modules (or more generally, memory resources) 808, and a plurality of IO slots or IO resources 810. All of these resources may be inventoried and initialized by a nucleus firmware instance 812 that spans hard partition 802. For example, when hard partition 802 includes just a single server blade, nucleus firmware instance 812 may be the copy of system firmware that resides on that blade. However, when hard partition 802 includes more than one server blade, nucleus firmware instance 812 may be merged from the individual copies of system firmware residing on the different blades, to span all of the blades.

Hard partition 802 also may include a plurality of hardware controllers 814, 816, 818, 820. Although four hardware controllers are depicted, system 800 typically will include at least one such hardware controller for each server blade included in the hard partition, disposed on that particular server blade. Accordingly, each hardware controller is typically configured to control the portion of the hardware resources of the hard partition resident on the associated server blade.

When system 800 is booted, nucleus firmware instance 812 initializes and inventories the resources of the associated hard partition. In addition, nucleus firmware instance 812 prepares to launch one or more new instances of itself, each of which will be configured to control a subset of the system's hardware resources and to act as a system abstraction layer (SAL) that can host a variety of operating system types within a soft partition.

When a soft partitioning request is received by a central service processor (not shown in FIG. 8), it will be transmitted to the nucleus firmware instance in the form of partitioning instructions or commands. When nucleus firmware instance 812 receives a soft partitioning command or set of commands, it will launch a separate instance of itself corresponding to each soft partition to be created. In FIG. 8, these separate firmware instances are indicated at 822, 824, 826 and 828, and the associated soft partitions are indicated at 830, 832, 834 and 836.

After launching separate instances of itself, the nucleus firmware instance will allocate various partitionable hardware resources to each soft partition by allocating control of the resources to each separate firmware instance. The resources allocated to each separate firmware instance will typically include a hardware controller, a set of CPUs, a set of memory resources, and a set of IO resources. Collectively, these become the hardware resources "owned" by a particular soft partition. Any resources not assigned to a soft partition remain "owned" by nucleus firmware instance 812. Each separate firmware instance may be allocated resources exclusively, so that there are not shared resources between separate firmware instances.

FIG. 9 is a schematic diagram depicting how operating systems hosted by soft partitions access various hardware resources according to an embodiment of the present invention. FIG. 9 is generally similar to FIG. 2, except that it depicts a plurality of separate firmware instances corresponding to various soft partitions. More specifically, FIG. 9 depicts a server system, generally indicated at 900, in which a hard partition has been divided into three soft partitions, each of which hosts an associated operating system 902, 904, 906. More generally, a server system according to the present teachings may be divided into any number of soft partitions, including one, two, or more than three.

Three separate firmware instances 908, 910, 912 are each configured to control a portion of the partitionable hardware resources of system 900 and to allow nonoverlapping operating system access. Thus, firmware instance 908 provides operating system 902 with access to hardware resources 914, firmware instance 910 provides operating system 904 with access to hardware resources 916, and firmware instance 912 provides operating system 906 with access to hardware resources 918. Firmware instances 908, 910, 912 are typically launched by a nucleus firmware instance in response to partitioning commands from a central service processor, as described previously.

System 900 also includes shared hardware resources 920 that will generally be used by more than one soft partition. These shared hardware resources may include, for example, memory controllers, IO controllers, and/or server cell controllers, among others. Shared hardware resources 920 are controlled by a nucleus firmware instance 922 that runs independently of the soft partition operating systems. Controlling shared hardware resources 920 with nucleus firmware instance 922 avoids conflicting operating system accesses of the shared hardware resources by operating systems 902, 904 and 906.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

We claim:

1. A computer server system, comprising:
a plurality of modular server blades in a hard partition;

a separate central service processor networked to the modular server blades;

firmware resident on the separate central service processor to receive partitioning requests, to formulate partitioning instructions based on the requests and to transmit the instructions to the modular server blades; and copies of system firmware resident on the modular server blades that are merged to form a nucleus firmware instance to create at least one soft partition based on the partitioning instructions and to assign partitionable hardware resources of the modular server blades to the at least one soft partition.

2. The computer server system of claim 1, wherein the separate central service processor provides a user interface and receives the partitioning requests at the user interface.

3. The computer server system of claim 2, wherein the user interface receives requests for both soft partitions and hard partitions.

4. The computer server system of claim 1, wherein the firmware resident on the modular server blades activates and controls the partitionable hardware resources.

5. The computer server system of claim 4, further comprising shared hardware resources, and wherein the nucleus firmware instance activates and controls the shared hardware resources.

6. The computer server system of claim 5, wherein the partitionable hardware resources include CPUs, memory and IO slots, and wherein the shared hardware resources include cell controllers, memory controllers and IO controllers.

7. The computer server system of claim 1, wherein a first portion of the firmware resident on the modular server blades assigns the partitionable hardware resources to the hosted operating systems, and a second portion of the firmware resident on the modular server blades runs independently of the associated operating systems and controls shared hardware resources.

8. The computer server system of claim 1, wherein each partitionable hardware resource is assigned to one soft partition at a time.

9. A method of partitioning a computer server system, comprising:

receiving a partitioning request at a separate central service processor;

formulating partitioning instructions based on the partitioning request with firmware resident on the separate central service processor;

transmitting the partitioning instructions to system firmware resident on at least one modular server blade;

merging copies of system firmware resident on multiple modular server blades in a hard partition to form a nucleus firmware instance; and in response to receiving the partitioning instructions, assigning partitionable hardware resources of the at least one modular server blade to at least one soft partition with the nucleus firmware instance.

10. The method of claim 9, further comprising providing a user interface with the separate central service processor, receiving the partitioning request at the user interface, and transmitting the partitioning request to the firmware resident on the separate central service processor.

11. The method of claim 10, further comprising the user interface receiving requests for both soft partitions and hard partitions.

12. The method of claim 9, further comprising providing a user interface with an operating system hosted by a preexisting hard partition, receiving the partitioning request at the user interface, and transmitting the partitioning request to the firmware resident on the separate central service processor.

13. The method of claim 9, further comprising initializing the partitionable hardware resources with a first component of the firmware resident on the at least one modular server blade.

14. The method of claim 13, further comprising initializing shared hardware resources with the nucleus firmware instance that operates independently of the associated operating systems.

15. The method of claim 14, further comprising controlling the partitionable hardware resources with the first component of the firmware resident on the at least one modular server blade, and controlling the shared hardware resources with the nucleus firmware instance.

16. The method of claim 9, wherein assigning the partitionable hardware resources comprises performing such that each partitionable hardware resource is assigned only to one soft partition at a time.

17. A method of allocating hardware resources of a computer server system to a plurality of soft partitions, comprising:

receiving a soft partitioning request;

transmitting the soft partitioning request to a separate central service processor;

with firmware resident on the separate central service processor, formulating partitioning instructions based on the partitioning request;

transmitting the partitioning instructions to system firmware of at least one of a plurality of modular server blades resident on a hard partition, the hard partition including a plurality of partitionable hardware resources;

merging copies of system firmware resident on multiple modular server blades to form a nucleus firmware instance; and assigning, by the nucleus firmware instance, a portion of the partitionable hardware resources of the hard partition to each of a plurality of soft partitions based on the partitioning instructions.

18. The method of claim 17, further comprising assigning the partitionable hardware resources to each soft partition such that the partitionable hardware resources are accessible by a corresponding operating system without modification of the operating system.

19. The method of claim 17, further comprising controlling shared hardware resources with the nucleus firmware instance configured to prevent control of the shared hardware resources by any of the operating systems.

20. The method of claim 17, further comprising assigning the portions of the partitionable hardware resources to each soft partition such that the partitionable hardware resources are nonoverlapping.

* * * * *